United States Patent
Verna et al.

(10) Patent No.: US 8,970,400 B2
(45) Date of Patent: Mar. 3, 2015

(54) UNMANNED VEHICLE CIVIL COMMUNICATIONS SYSTEMS AND METHODS

(75) Inventors: Anthony Verna, Woodland Hills, CA (US); Luis M. Ortiz, Albuquerque, NM (US); Kermit D. Lopez, Albuquerque, NM (US)

(73) Assignee: Verna IP Holdings, LLC, Albuquerque, NM (US)

( * ) Notice: Subject to any disclaimer, the term of this patent is extended or adjusted under 35 U.S.C. 154(b) by 73 days.

(21) Appl. No.: 13/361,409

(22) Filed: Jan. 30, 2012

(65) Prior Publication Data

US 2012/0299751 A1 Nov. 29, 2012

Related U.S. Application Data

(63) Continuation-in-part of application No. 13/324,118, filed on Dec. 13, 2011, now Pat. No. 8,265,938.

(60) Provisional application No. 61/489,621, filed on May 24, 2011.

(51) Int. Cl.
*G08B 21/00* (2006.01)
*H04L 29/08* (2006.01)
*H04L 29/06* (2006.01)
(Continued)

(52) U.S. Cl.
CPC .............. *H04L 67/26* (2013.01); *H04L 63/105* (2013.01); *G10L 13/043* (2013.01); *H04M 11/04* (2013.01); *H04L 67/12* (2013.01)
USPC .......................... 340/945; 713/166; 455/404.2

(58) Field of Classification Search
CPC .......................... H04L 63/105; G06F 21/6227
USPC ....................... 713/166; 709/225; 379/37–51; 455/404.2, 521
See application file for complete search history.

(56) References Cited

U.S. PATENT DOCUMENTS

| 6,151,385 A | 11/2000 | Reich et al. | 379/49 |
| 6,510,207 B1 | 1/2003 | Cannon et al. | 379/68 |
| 7,162,528 B1 * | 1/2007 | Simonoff et al. | 709/229 |

(Continued)

OTHER PUBLICATIONS

DeBusk, Wesley M., "Unmanned Aerial Vehicle Systems for Disaster Relief: Tornado Alley", Apr. 6, 2009, NASA Technical Reports Server (NTRS), Document ID: 20090036330, http://ntrs.nasa.gov/search.jsp?R=20090036330.*

(Continued)

*Primary Examiner* — John A Tweel, Jr.
(74) *Attorney, Agent, or Firm* — Luis M. Oritz; Kermit D. Lopez; Ortiz & Lopez, PLLC

(57) ABSTRACT

A mass notification push application and a civic-communication application combined into one with the primary purpose of allowing up-to-the-minute UAV aerial imagery as selected by drone ground-based commanders to be automatically transmitted to subscribed end-users via the current OS mobile operating systems for smartphones, iPads, laptops, and web-enabled devices in a manner comprised of separate technologies such as voice (voice to text, voice recognition), video stills (embedded with personalized iconographic identifiers), and with a secondary purpose of allowing the notified recipients to engage others by allowing the retransmitting of received messages along with (or without) registered user annotations so as to create a civil communications hub for wider, real-time dissemination of ongoing situational awareness data.

6 Claims, 4 Drawing Sheets

Figure 1:
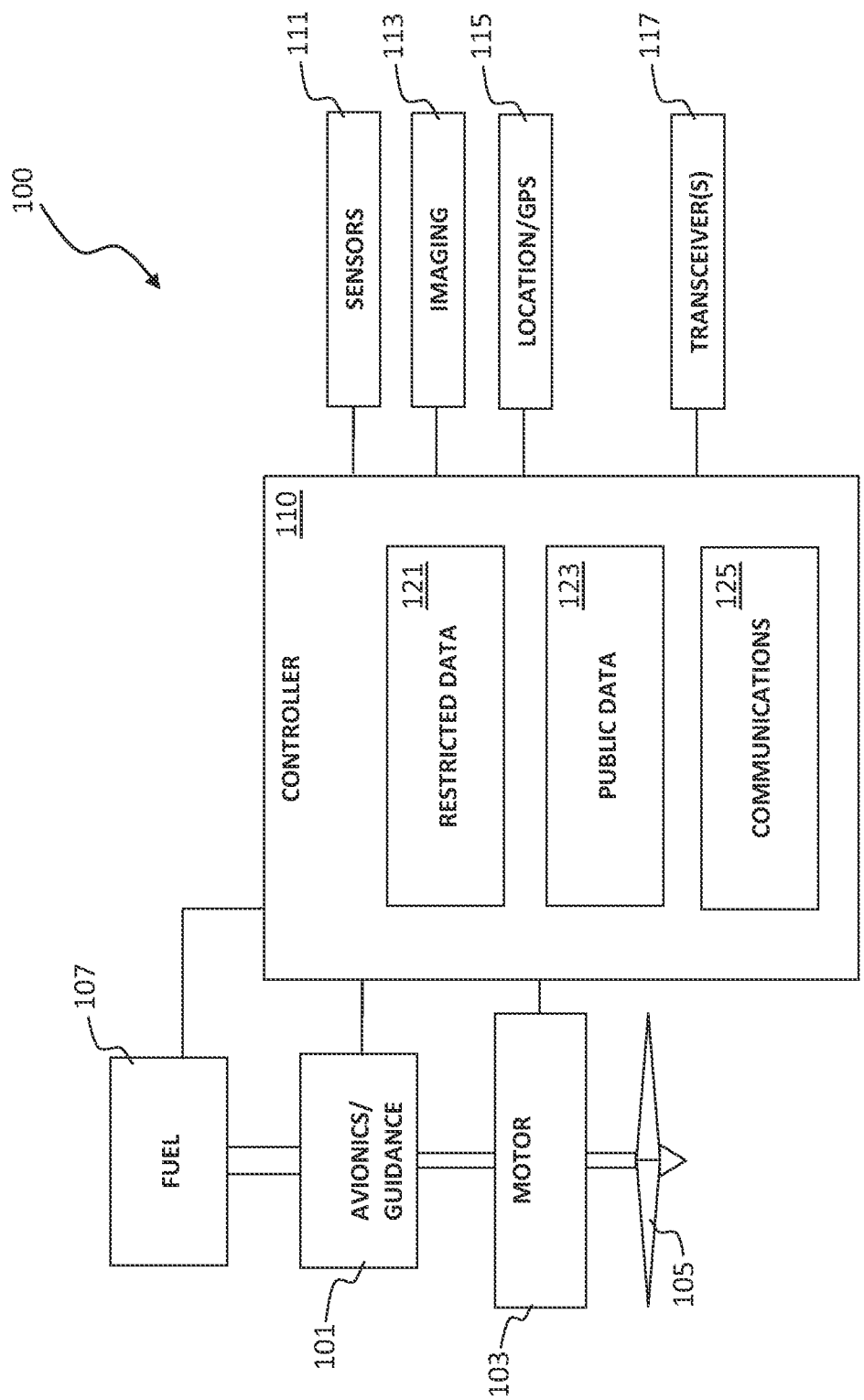

(51) Int. Cl.
*G10L 13/04* (2013.01)
*H04M 11/04* (2006.01)

(56) References Cited

U.S. PATENT DOCUMENTS

| | | | |
|---|---|---|---|
| 7,312,712 B1 * | 12/2007 | Worrall | 340/573.4 |
| 7,356,129 B1 | 4/2008 | Moody | 379/45 |
| 7,391,314 B2 | 6/2008 | Lemmon | 340/506 |
| 7,508,307 B2 | 3/2009 | Albert | 340/573.1 |
| 7,617,162 B2 | 11/2009 | Saini | 705/500 |
| 7,620,735 B2 | 11/2009 | Salim et al. | 709/246 |
| 7,627,092 B2 | 12/2009 | Contractor | 379/45 |
| 7,756,539 B2 | 7/2010 | Milstein et al. | 455/518 |
| 7,885,817 B2 | 2/2011 | Paek et al. | 704/270 |
| 7,890,586 B1 | 2/2011 | McNamara et al. | 709/206 |
| 7,899,476 B2 | 3/2011 | Cheng et al. | 455/466 |
| 7,920,679 B1 | 4/2011 | Naim et al. | 379/45 |
| 7,933,385 B2 | 4/2011 | Dickinson et al. | 379/45 |
| 2008/0227435 A1 * | 9/2008 | Six et al. | 455/414.1 |
| 2008/0291849 A1 * | 11/2008 | Ostermeier et al. | 370/270 |
| 2009/0023418 A1 | 1/2009 | Grevers, Jr. | 455/404.1 |
| 2009/0313020 A1 | 12/2009 | Koivunen | 704/260 |
| 2010/0226259 A1 | 9/2010 | Desmond et al. | 370/242 |
| 2010/0260061 A1 | 10/2010 | Bojahra et al. | 370/252 |
| 2010/0268539 A1 | 10/2010 | Xu et al. | 704/260 |
| 2010/0306534 A1 * | 12/2010 | Teijido et al. | 713/166 |
| 2011/0111805 A1 | 5/2011 | Paquier et al. | 455/563 |

OTHER PUBLICATIONS

"PLAN" Personal Localized Alerting Network; Federal Communications Commission, May 10, 2011.

Wyatt, Edward; "Emergency Alert System Expected for Cellphones"; May 9, 2011; NYTimes.com.

How to Avoid Robotic Voice Text to Speech Synthesis; http:/www.zero2000.com/articles/how-to-avoid-robotic-voice-text-to-speech-synthesis.html, May 15, 2011.

7 Key Considerations for Selecting an Alert Notification Service, ADT, 2012.

Intelligent Remote Monitoring and Management with Multi-Tech's Intelligent Wireless Router; MultiTech Systems, Mar. 2010.

Orpheus, Meridian One Speech; http://www.meridian-one-co.uk/orpheus.html, May 15, 2011.

* cited by examiner

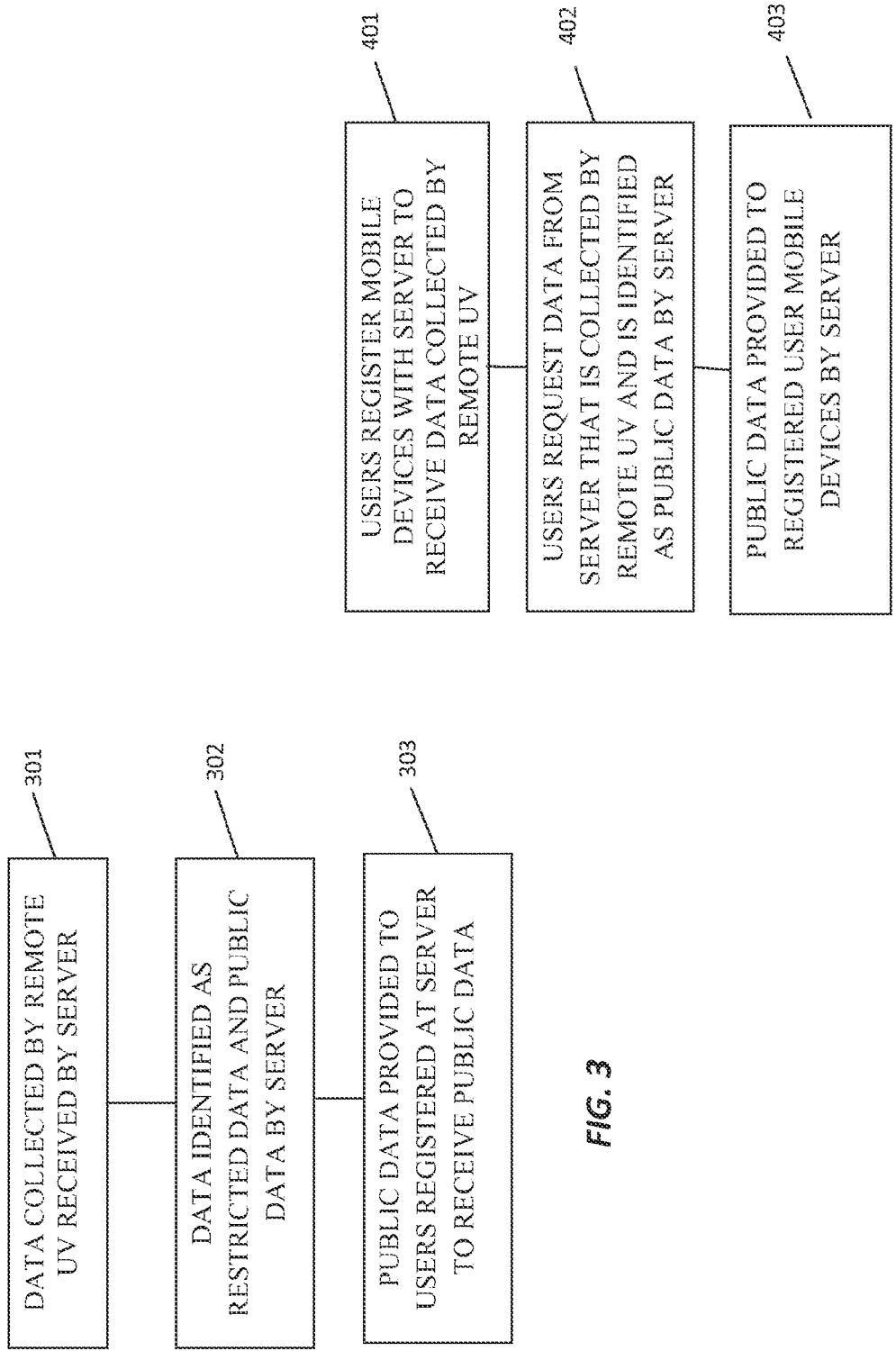

8,970,400 B2

UNMANNED VEHICLE CIVIL COMMUNICATIONS SYSTEMS AND METHODS

INVENTION PRIORITY

The present patent application claims priority as a continuation-in-part of U.S. patent application Ser. No. 13/324,118, filed Dec. 13, 2011, now U.S. Pat. No. 8,265,938, entitled "VOICE ALERT METHODS, SYSTEMS AND PROCESSOR-READABLE MEDIA", which was also filed with priority to provisional patent application Ser. No. 61/489,621, on May 24, 2011.

TECHNICAL FIELD

The present invention is related to emergency communications systems. The present invention is also related to unmanned vehicles (air, ground, and maritime). More particularly, the present invention is related to systems and methods using unmanned vehicles within an improved communications system to provide real-time data for civil emergency notification purposes.

BACKGROUND

Most mass notification technologies send the same message to everyone, regardless of their role, responsibilities, location, or involvement in a critical situation by means of a large-scale telephone call out to pre-determined contact lists. These initial notifications include and usually start with 911 calls or official notifications to regulatory agencies if the situation requires it. An increasing number of notification systems provide two-way telephone communication with feedback loops, short response messages, and conference bridging to facilitate teamwork. City website also exists to keep information flowing from official sources to help residents respond to all types of emergencies.

Unmanned Aerial Vehicles (UAVs) have become the leaders in persistent surveillance over the past several years for federal and state agencies (e.g., U.S. Military, FBI, local and state police, U.S. Forest Service, U.S. Border Patrol, etc). Private commercial applications are also feasible and foreseeable (e.g., large private land holdings or leased open space, environmental and geographical data gathering, university research). UAVs have the distinctive capability of providing better-than-human, aerial, visual information to ground units that may not have the time or means to use a manned plane for their surveillance/reconnaissance. The RQ-11 Raven, for example, is a man-packable, hand-launched, unit-controlled UAV that is used primarily by Air Force Special Operations Command (AFSOC) to easily scout ahead without unnecessary risk to personnel or risk of detection. The RQ-11 Raven, however, has a short dwell time (e.g., the total time of operation in air) limited data acquisition capabilities (e.g., restricted camera and sensor payload). More robust UAVs are larger, require more sophisticated launch systems, can operate for longer durations of time, and can carry an array of sensors and communications capabilities.

A ground control operator can remotely fly and control an unmanned aerial vehicle (UAV), also known as a pilotless drone. Land- and maritime-based vehicles are similarly controlled. These unmanned vehicles are equipped with camera equipment and are best known for capturing real-time images during warfare, but now these drones have become increasingly affordable for use in civilian high risk incidents such as search missions, border security, wildfire and oil spill detection, police tracking, weather monitoring, and natural disasters. During its mission, the airborne drone acquires image data from the camera and flight parameters from onboard systems. The aerial footage captured by the camera onboard the UAV is transmitted to the Ground Control Station which transfers it to their work station for analysis and possible enhancement. A frame grabber digitizes image data and transfers it to a Host PC and multiple embedded processor boards to achieve real time image processing. UAV software can be used in the playback of the flight video image and data captured by the unmanned mission in a form of DVD connected to the embedded vision system. Such a system typically processes the images using Image processing application software in the form a GUI menu, which displays input and processed images for analysis.

The size of the image to be processed by remote sensing end users is typically 20-40 Mbytes per spectral band. Digital image processing involves the implementation of computer algorithms aimed to fulfill several tasks in acquisition, management, and enhancement and processing of images in digital format. Thus, with the widespread development of computer technology, it has become the subject of many useful computer applications.

Land based unmanned vehicles can also be utilized to collect data. Like UAVs, ULVs (unmanned land vehicles) are operated at a distance by wireless remote control. A remote operator manages most operations, while data collection can occur automatically with onboard sensors and cameras.

Despite the increasing rollout of unmanned vehicles (air and land), their use and data collection is generally restricted to government users and for government activity. Some data that is collected by these modern resources can, however, provide important, life-saving information to civilians. The present inventors believe that some collected data can be chosen for real-time public release to assist civilians at times of state or national emergency. Many current examples are in the press on a regular basis where additional data could have assisted civilians faced with emergency situations. For example, during the 2011 Las Conchas Fire near Los Alamos, N. Mex., a number of New Mexico citizens living near the fire had to form a telephone circle to keep up with the latest and that they were still angry because this form of "old school media" was too slow and not specific enough. These New Mexico citizens complained how the Internet was falling short of its potential, and because of this, they needed to check and recheck many sources to keep up to date and that another downer was that these sources turned out to be updating information intermittently. Those monitoring the fire praised Facebook and Twitter feeds for keeping them informed on their friends, but said that the Los Alamos County Government had very little information on its fire-related site. The Las Conchas Fire 2011 Wildfire in New Mexico burned more than 150,000 acres, threatening Los Alamos National Laboratory and the town of Los Alamos. After five days of burning, it became the largest wildfire in New Mexico's state history.

Currently, existing emergency services continue to operate solely within their own limited spheres with no sourcing real-time drone images for the rapid integration of such intelligence within the architecture of their emergency system. None of these mass notification services are deploying up-to-the-minute UAV aerial imagery to automatically notify the public in real-time via transmission to public recipient computers, portable devices, and smartphones, and with a secondary purpose of providing the notified recipients with the ability to engage others by retransmitting received messages along with their own typed notations so as to be able to communicate continually in an ongoing and multilingual manner, thus forming their own real-time Civic Communications Hub for ongoing situational awareness and providing age-appropriate advice to family and friends, according to the ongoing dangers of the situation being faced.

Most mass notification technologies send the same message to everyone, regardless of their role, responsibilities, location, or involvement in a critical situation by means of a large-scale telephone call out to a pre-determined contact lists. These initial notifications include and usually start with 911 calls or official notifications to regulatory agencies, if the situation requires it. An increasing number of notification systems provide two-way telephone communication with feedback loops, short response messages, and conference bridging to facilitate teamwork. City websites also exist to keep information flowing from official sources and to help residents respond to all types of emergencies. But none of these services are contributing real-time drone images as an alternative means of spreading critical information to the endangered public as quickly as possible.

Based on the foregoing, there is clearly a growing civilian need fir improved emergency applications by providing citizens with selected unmanned vehicle images through push notifications via a data communications network such as the Internet, and that are not dependent on an aging public switched telephone network (PTSN), which is known to fail during certain crisis. A push notification can arrive in a manner comprised of separate technologies such as cellular/Internet voice (voice to text, voice recognition), video stills (embedded with personalized iconographic identifiers), and can further include the capability of a secondary purpose of allowing notified recipients to engage others by retransmitting the message received, along with their own typed notations, so as to create their own real-time civil communications hub for ongoing situational awareness (a system that currently doesn't exist, but can be achievable by software applications running on servers). Once software is in place within a system (e.g., including servers), the only major expense can be largely limited to yearly system maintenance and data management.

SUMMARY OF INVENTION

It is a feature of the present invention to provide a method for providing public users with data collected by an unmanned vehicle by receiving data collected by remote unmanned vehicle by a server, identifying the data as restricted data and public data at the server, and providing public data to users registered by the server to receive the public data.

It is also a feature of the present invention to provide a method for providing public users with data collected by an unmanned vehicle that registers mobile devices authorized to receive data collected by said remote unmanned vehicle at a server, wherein data collected by the remote unmanned vehicle is identified as restricted data and public data, and providing the public data to mobile devices registered by the server.

It is also a feature of the present invention to provide a system that can provide public users with data collected by an unmanned vehicle. The system can include a server programmed to receive data collected by an unmanned vehicle and identify the data as public data and restricted data, the server further programmed to register mobile devices and provide the mobile devices with the public data automatically or upon request by user of the mobile devices.

It is another feature of the invention to provide a mass notification push application and a civic-communication application combined into one, with the primary purpose of allowing up-to-the-minute UAV aerial imagery, as selected by drone ground-based commanders, to be automatically transmitted to subscribed end-users via the current mobile operating systems for smartphones, iPads, laptops, and web-enabled devices in a manner comprised of separate technologies such as voice (voice to text, voice recognition), video stills, and data that can be embedded with personalized iconographic identifiers and messages.

The present invention can also provide a public-use notification and communication application that transmits data after ground station enhancement so as to keep the public alerted as first as possible. The invention can enable civil UAV authorities to transmit UAV video along with their voice-and-text notations to the public via their smartphones, iPads, laptops, and web-enabled devices, thus enabling these application registrants to form a civil awareness hub that would allow them to stay connected in times of emergency.

It is yet another feature of the invention to provide a mass notification push application and a civic-communication application with a secondary purpose of allowing the notified recipients to engage others by retransmitting the message received, along with their own typed notations, so as to create their own real-time civic communications hub for ongoing situational awareness. The civil communications hub can allow users to forward messages to other recipients and the forwarded messages can include sending user annotations together with captured data sent by authorities.

It is another feature of the present invention to provide a new communication service and platform that enables unmanned vehicles commanders with a real-time central distribution hub in order to furnish commanders with the capability of instantly converging selected incoming UAV imagery-information as determined for actionable crisis management, and afterwards, giving commanders the capability of instantly transmitting these up-to-the-minute notifications straight to selected end-users via the current OS mobile operating systems for smartphones, iPads, laptops, and web-enabled devices, and to transmit these notifications in a manner comprised of separate technologies such as voice (voice to text, voice recognition), video stills (embedded with personalized iconographic identifiers), thus allowing end-users to automatically receive the messages, while in turn, providing these same end-users with the modifying capabilities of retransmitting those incoming messages with the addition of their own specialized information, thus creating a composite real-time picture of the scenario unfolding, one that could only be achieved by the app's integration of on-the-spot and on-the-fly notifications and without the looping-needs of pre-recorded phone messaging that are common from a fixed-remote Robo Call Center.

It is a feature of the present invention to use a customized push application for the transmission of imagery as captured by unmanned vehicles, and as collected by the UAV ground control servers, in order to provide up-to-the-minute non-restricted UAV imagery via the Internet.

It is also a feature of the present invention for its push app to transmit such data via the Internet whereby registered civic authorities and public end-users can automatically receive such data on their smartphones, iPads, laptops and web-enabled devices.

It is also a feature of the present invention to provide a system that can provide registered end-users with such data as collected by an unmanned vehicle. The system can include a server programmed to receive such data, whereby certain imagery can be classified as public, non-restricted data, thus allowing the further instant transmission of this data to registered mobile devices as dictated by server's data base listings.

It is another feature of the invention to provide a mass notification push application and a civil communications application combined into one with the primary purpose of allowing up-to-the-minute UAV aerial imagery as selected by Drone Ground Base Commanders to be automatically transmitted to subscribed end-users via the current mobile operating systems for smartphones, iPads, laptops, and web-enabled devices in a manner comprised of separate technologies such as voice (voice to text, voice recognition), video stills (embedded with personalized iconographic iconographic identifiers).

DETAILED DESCRIPTION

The present invention (which can also be referred to herein as "SkySpeak") differs from city websites and telephone-based emergency notification systems in as much as the SkySpeak application can deploy a software-centric web platform to automatically transmit instant voice notifications and enriched data to those who have installed the application onto their smartphone and Internet devices. Unlike being notified by an incoming phone call, the SkySpeak Application can automatically voice its message and display the video stills (embedded with personalized iconographic identifiers) on user handheld devices (e.g., smartphones, iPads, etc.) and can automatically voice its message as a multilingual transmission without the recipients having do anything to devices in use on their end.

Most UAV software seems to be for navigational and image enhancement purposes. The present invention can be provided as a web-based communication system using push-notifications to provide UV (Unmanned Vehicle) base stations with an emergency alert network for transmission of UV video and other components to Internet-connected end-users.

Referring to FIG. 1, an unmanned aerial vehicle (UAV) system 100 in accordance with an embodiment of the invention is illustrated that includes avionics and guidance module 101, a motor 103, propeller hardware 105, and a fuel source 107. Reference to an unmanned aerial vehicle (UAV) is not meant to limit application of features of the present invention to a particular vehicle system. It should be appreciated that the vehicle is unmanned but can also be land-based or maritime-based. Reference to an unmanned vehicle (UV) can more accurately set the scope for vehicles that can be used to collect data for the present invention. The UV is managed by a controller 110. An onboard controller can also manage sensors 111, imaging equipment 113, and location/GPS modules 115 engaged in navigation and data collection within the unmanned vehicle. Data collected by the UV can be separated into restricted data 121 and public data 123. Separation into these categories can occur onboard the UV or after transmission to a server (to be discussed in FIG. 2). A communications module 125 enables communication of the UV with remote resources (e.g., servers) via any means of wireless communications (e.g., cellular, microwave, satellite, etc.) reasonably available in the unmanned vehicle field.

Figure 2:
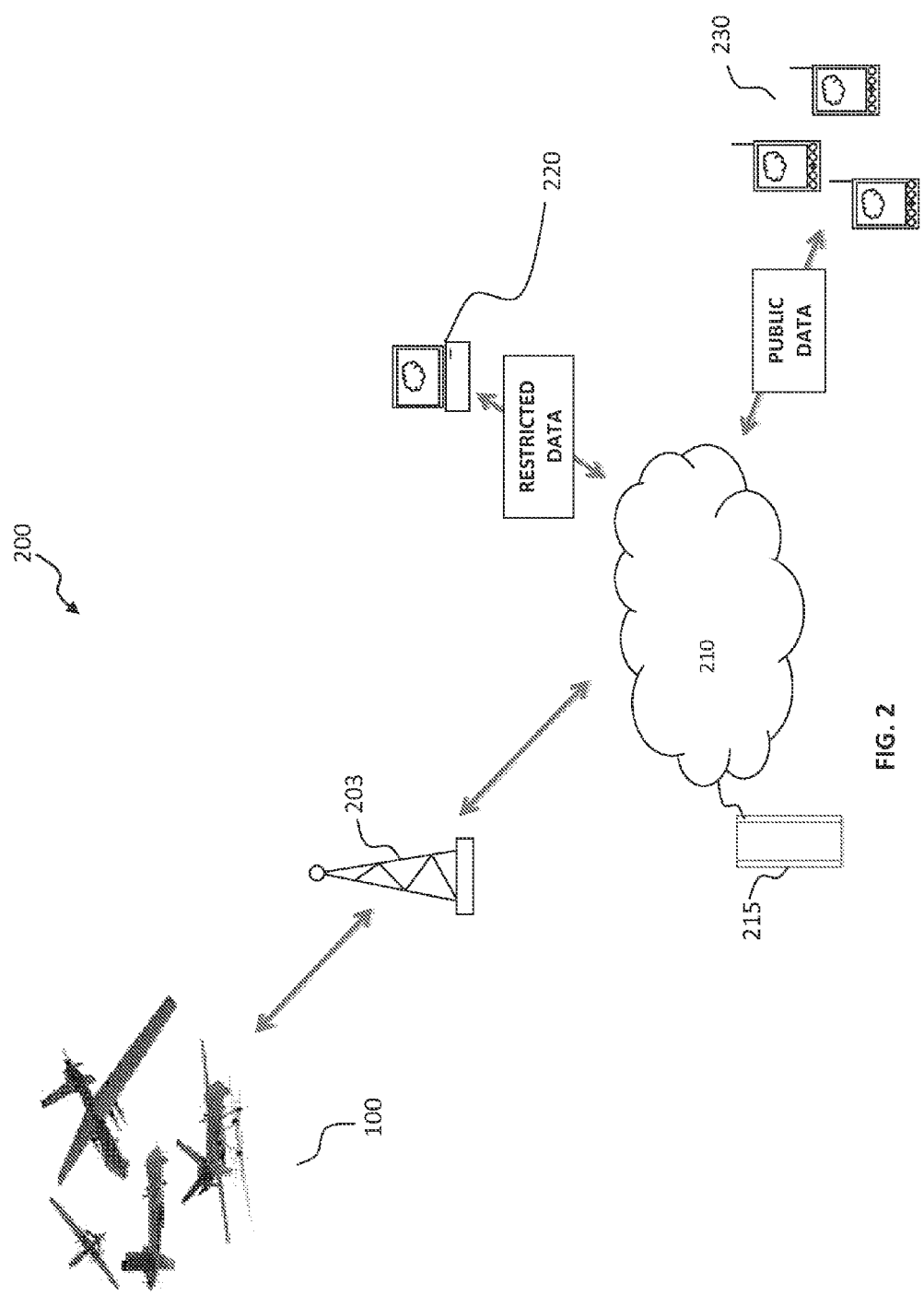

Referring to FIG. 2, a system 200 in accordance with features of the present invention is shown. UVs 100 are shown transmitting data through wireless communications means 203 (e.g., cellular transmission) through a data network 210 wherein data can be received and managed by a server 215. The server 215 can organize data into restricted data and public data. Restricted data can go to clients 220 controlled by authorities (e.g., police, government operators), wherein public data can be provided to mobile devices 230 (e.g., smartphones) that are registered with the server to receive public data.

Referring to FIG. 3, a flow chart of a method in accordance with features of the present invention is shown. Data collected by a remote unmanned vehicle can be transmitted to be received by a server, as shown in step 301. Data can then be identified as restricted data and public data at the server, as shown in step 302. Then, as shown in step 303, public data can be provided to users registered at the server to receive the public data. Restricted data can be accessed by cleared civil personnel such as police or government operators (e.g., homeland security, ICE, FBI), while public data can be received by civilians and reporters and the cleared civil personnel.

Referring to FIG. 4, a flow diagram is shown in accordance with features of the invention. As shown in step 401, users can register their mobile devices with a server to receive data collected by remote unmanned vehicles. Then as shown in step 402, users can request data from the server, wherein the data can be collected by an unmanned vehicle and identified as public data by the server. The server, as shown in step 403, can then provide public data to registered user mobile devices.

Figure 5:
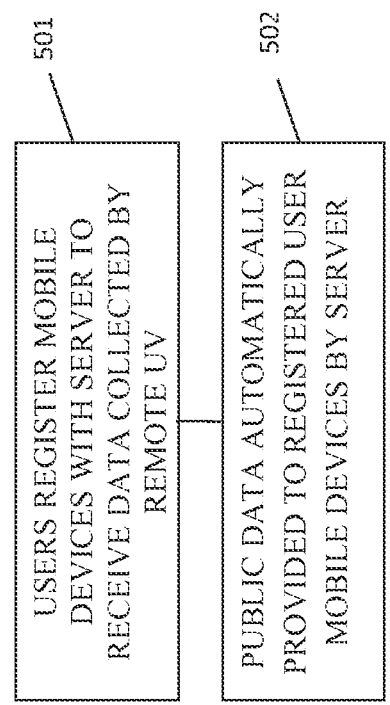

Referring to FIG. 5, another flow diagram is shown wherein users can register their mobile devices with a server to receive data collected by remote unmanned vehicles, as shown in step 501. Then, as shown in step 502, the server can automatically provide public data to registered user mobile devices.

Instant Knowledge is king in-times-of-emergency. The present invention can be used to instantly inform authorities and members of a community with instant voice notifications, which can also supplement other emergency services as the FEMA National Radio System (FNARS), the Emergency Alert System (EAS), which is a national warning system in the United States which uses AM, FM, and Land Mobile Radio Service as well as broadcasts via VHF, UHF, and cable television including low-power stations and with EAN (Emergency Action Notification), and with AMBER Alerts and with their existing robo-calling, telephone-based centers serving 911 Reverse and NG 911.

Robo-callers are often connected to a pubic switched telephone network by multiple phone lines because they can only send out one message at a time per phone line. The advantage of the robo-caller is that it is compatible with the most basic phone service. That very basic service has essentially stayed unchanged for a century because it is just a simple phone on a landline.

On the other hand, the present invention does not make phone calls. It cannot get a busy signal because it is not making a phone call. It receives the alert as data regardless if the alert is vocal or text, an application operating on a user's handheld devices then plays the message. The recipient simply gets the message. Text can be transmitted to user handheld device where it can also be converted to speech. One benefit is lower bandwidth, which means you can alert more people more quickly. The other is that the text goes through a non-voice channel to the phone.

The present invention can use communications methods other than the phone's voice channel. Alerts can be received by people already talking on their smartphones. Alerts can be somewhat intrusive in that they can nag recipients until they at least acknowledge the alert.

The registration process can be far simpler in that the user only needs to download the application on their mobile device, everything else (e.g., communications with a data providing server) can be automated. The present invention can be fully capable of delivering vocally recorded alerts, visuals, text alerts, and supplemental information.

A data recipient should not need to answer the telephone in order to receive basic alert information because a message can be played on their handheld device display and/or announced via their handheld device speaker with the present invention. Spoken data is especially important for drivers and similarly occupied people that cannot take a moment to read a display.

As an example of the inventions use, a UAV ground base station notifier can select a drone-image and enters it onto the application's screen display. The notifier can then use the application's voice recognition to dictate an accompanying voice-activated message that is typed and that can be uttered automatically. The combined content can be transmitted to selected recipients who can then type their own comments to other recipients thus forming an ongoing web-enabled hub for the constant updating of information over OS mobile operating systems for smartphones, iPads, and laptops.

Once the UAV Ground Base Station (land, maritime or air) notifier selects a screen image and enters on to the interface of a server-based application, the notifier can have the ability to modify his notifications with a voice-activated message that is automatically typed as text and/or uttered via speaker when transmitted to end-user handheld devices.

In accordance with an optional feature, once the notification is received recipients in turn can use the present system to type their own comments and forward them to other recipients, thus forming an ongoing web-enabled hub for the constant updating of information. The system can also recognize that notification is not communication, and that the notification, in itself, does not guarantee an ongoing communication. The system can, for example, allow the imagery expert at a drone base stations video terminal to quickly transmit a still frame as captured from the incoming video and automatically resize it, such as to 460 kb, and attach it to the application's user interface (UI) such as a display screen on which a voice and text symbol can appear so that an imagery expert can easily dictate the text caption to be submitted with a photo (such as using Google HTML+CSS code for implementation) and then can automatically submit the notification to the registered recipients smartphone or web-enabled devices along with the expert's voice.

In light of the foregoing and using the forest fire example, suppose that the sheriff who spots a fire could use an application to notify UAV Control to send up a drone then, when a drone takes flight, incoming video from the UAV can be sent automatically to all authorities over a data communication network (wired or wireless). In the aforementioned Las Conchas Fire, it is conceivable that a forest ranger could have been in such a position so as to have mitigated the extent of damages by quickly providing more information to the public. Authorities can analyze data and determine a risk assessment for the situation. Authorities can then decide to send a new request for more data and also whether the data should be shared publically. If data (e.g., video, still images) is approved for public dissemination by authorities (this needs to be "authorized"), then data can be provided to the public using automatic instant voice alerts to mobile devices registered with the system. Notification can be sent to registered users along with the authorities desired voice/text/map additions without the registered citizens having to do anything. Registered users can also send the notification and their own notes to other recipients using the system or other communications (e.g., SMS) and form a community awareness hub.

The invention claimed is:

1. A method for providing public users with data collected by an unmanned vehicle, comprising:
   receiving data including video in a server, said data collected by remote unmanned vehicle;
   providing said data to an operator for classification as restricted data and public data within said server;
   providing a multilingual instant notification message with at least one of the public data or about the availability of the public data to mobile handheld devices registered with the server to receive or obtain access to the public data from the server; and
   providing notified recipients operating said mobile handheld devices an ability to engage other recipients by retransmitting received multilingual messages along with notations typed by the notified recipients so as to be able to communicate with the other recipients in an ongoing, multilingual manner and thereby creating a real-time Civic Communications Hub operated by notified recipients for ongoing situational awareness and providing advice to family and friends based on ongoing dangers of a situation being faced.

2. The method for providing public users with data collected by an unmanned vehicle of claim 1, wherein said unmanned vehicle is at least one of: an unmanned aerial vehicle, an unmanned land vehicle, and an unmanned maritime vehicle.

3. A method for providing public users with data collected by an unmanned vehicle, comprising:
   registering with a server mobile handheld devices authorized to receive data including video collected by said remote unmanned vehicle in the server;
   receiving data collected in real-time by at least one remote unmanned vehicle and storing the data in the server, wherein the data collected by said remote unmanned vehicle and stored in the server is classified by an operator as restricted data and public data;
   providing a multilingual instant notification message with at least one of the pubic data or about the availability of the public data to said mobile handheld devices registered at said server to receive or obtain access to the public data from the server; and
   providing notified recipients operating said mobile handheld devices an ability to engage other recipients by retransmitting received multilingual messages along with notations typed by the notified recipients so as to be able to communicate with the other recipients in an ongoing, multilingual manner and thereby creating a real-time Civic Communications Hub operated by notified recipients for ongoing situational awareness and providing advice to family and friends based on ongoing dangers of a situation being faced.

4. The method for providing public users with data collected by an unmanned vehicle of claim 3, wherein said unmanned vehicle is at least one of: an unmanned aerial vehicle, an unmanned land vehicle, and an unmanned maritime vehicle.

5. A system providing public users with data collected by at least one remote unmanned vehicle, comprising: a server programmed to register mobile handheld devices authorized to receive data including video collected by said at least one remote unmanned vehicle, receive data collected by an said at least one remote unmanned vehicle, enable operator access for classification of data as public or restricted within said server, to receive operator instructions to identify said data as public data and restricted data, provide said mobile handheld devices with at least one of said public data or a multilingual instant notification message upon the availability of the public data in said server and enabling retrieval of said public data from said server automatically or upon request by user of said mobile devices, and enabling notified recipients operating said mobile handheld devices an ability to engage other recipients by retransmitting received multilingual messages along with notations typed by the notified recipients so as to be able to communicate with the other recipients in an ongoing, multilingual manner and thereby creating a real-time Civic Communications Hub operated by notified recipients for ongoing situational awareness and providing advice to family and friends based on ongoing dangers of a situation being faced.

6. The system providing public users with data collected by an unmanned vehicle of claim 5, further comprising said server programmed to function as a civil communications hub wherein said users registered by said server forward messages received from said server to additional recipients with or without annotations.

* * * * *